United States Patent
Ogawa

(10) Patent No.: US 7,306,541 B2
(45) Date of Patent: Dec. 11, 2007

(54) CONTROL APPARATUS FOR VEHICLE

(75) Inventor: Hiroyuki Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 275 days.

(21) Appl. No.: 11/223,968

(22) Filed: Sep. 13, 2005

(65) Prior Publication Data

US 2006/0089234 A1    Apr. 27, 2006

(30) Foreign Application Priority Data

Oct. 25, 2004    (JP)    ............................. 2004-309913

(51) Int. Cl.
*B60W 10/04*    (2006.01)
(52) U.S. Cl. ..................... 477/107; 477/110
(58) Field of Classification Search ................. 477/107, 477/110
See application file for complete search history.

(56) References Cited

U.S. PATENT DOCUMENTS 4,833,612 A * 5/1989 Okuno et al. ................. 701/95
4,962,679 A * 10/1990 Ishikawa et al. .............. 60/449
5,040,114 A * 8/1991 Ishikawa et al. .............. 701/54
5,754,428 A * 5/1998 Ishikawa ....................... 701/55

FOREIGN PATENT DOCUMENTS

| EP | 0 803 395 A2 | 10/1997 |
| JP | 10-9018 | 1/1998 |
| JP | 2006132463 A * | 5/2006 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

An ECT_ECU executes a program including the step of identifying the drive mode, the step of determining whether the engine is in an idling state or not, the step of detecting the speed of an automatic transmission when not in an idling state, the step of detecting an accelerator press-down rate of change, the step of detecting vehicle speed, the step of calculating a target acceleration rate of change of the vehicle based on the drive mode, speed of the automatic transmission, accelerator press-down rate of change, and vehicle speed, and the step of calculating the target acceleration by integrating the calculated target acceleration rate of change with respect to time.

8 Claims, 3 Drawing Sheets

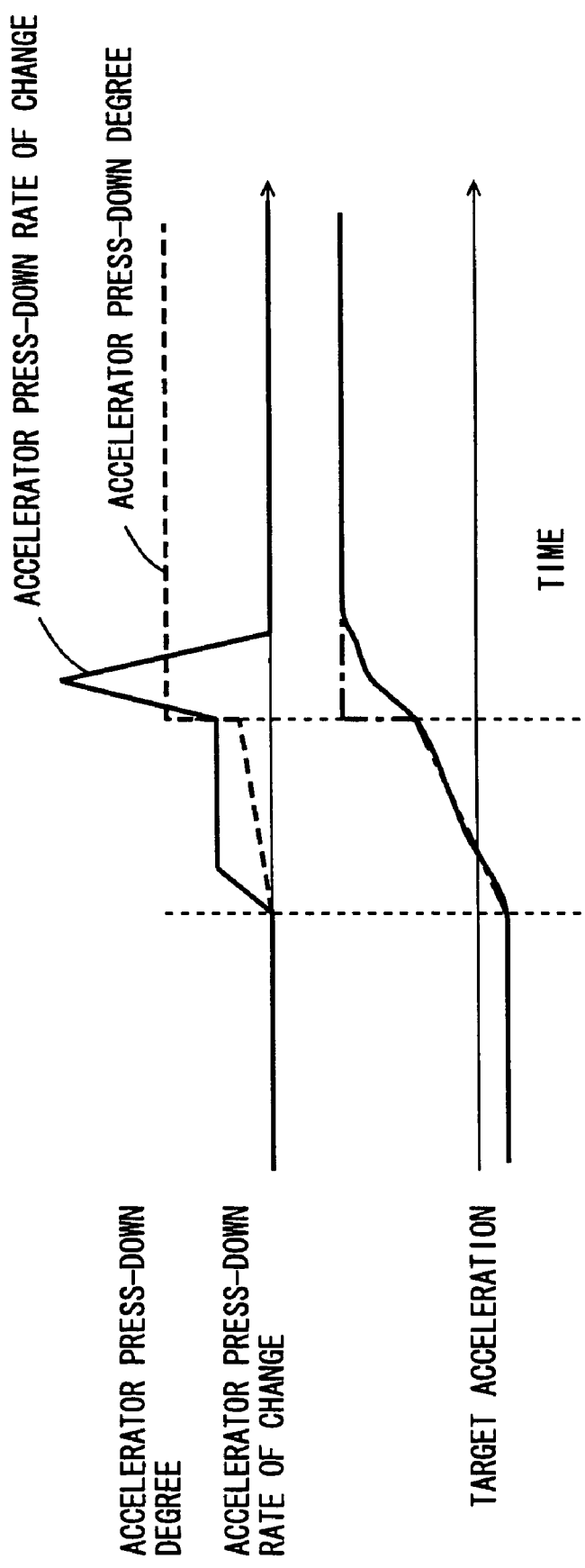

CONTROL APPARATUS FOR VEHICLE

This nonprovisional application is based on Japanese Patent Application No. 2004-309913 filed with the Japan Patent Office on Oct. 25, 2004 the entire contents of which are hereby incorporated by reference.

BACKGROUND OF THE INVENTION

1. Field of the Invention

The present invention relates to a control apparatus for a vehicle, particularly a control apparatus for a vehicle calculating target acceleration to have the driving force controlled based on the calculated target acceleration.

2. Description of the Background Art

It is conventionally known that the acceleration of a vehicle greatly affects the drivability. In other words, the driver will sense discomfort if the acceleration is too great or too small. It is therefore necessary to appropriately control the acceleration of a vehicle.

Japanese Patent Laying-Open No. 10-009018 discloses a driving force control device for a vehicle that can provide an appropriate feel of acceleration. The driving force control device disclosed in this publication controls the driving force of a vehicle in which the vibration in the longitudinal direction is reduced by temporarily decreasing the engine output at the time of resuming fuel supply from a coasting state in which fuel supply is ceased. This driving force control device includes a detection unit detecting the accelerator press-down degree, a throttle control unit that can control the throttle opening of the engine independent of the accelerator press-down degree, and a driving force rate change limiter limiting the changing rate of the target driving force with respect to change in the accelerator when output control is executed through vibration reducer.

In accordance with the driving force control device disclosed in the publication set forth above, the engine output property is corrected so as to suppress torsional vibration of the driveline at the time of reacceleration from a coasting state. At the same time, the changing property of the target driving force is limited with respect to the change in the accelerator. When the changing rate or changing amount of the accelerator is greater than a predetermined value, the target driving force is limited, whereby the acceleration property becomes more gentle than the actual change in the accelerator. Accordingly, vibration in the longitudinal direction of the vehicle at the time of reacceleration is suppressed to provide a better feel of acceleration. The abrupt feel of acceleration that becomes excessive can be suppressed effectively by rendering gentle the actual acceleration property with respect to change in the accelerator.

The driving force control device disclosed in Japanese Patent Laying-Open No. 10-009018 is disadvantageous in that the acceleration property may not be rendered gentle in the region where the changing property of the target driving force is not limited, leading to the possibility of applying discomfort to the occupant caused by the abrupt acceleration. Further, if the changing rate of the target driving force is limited, the target driving force per se will be also limited correspondingly. The expected feel of acceleration cannot be obtained in the case where the occupant wishes for prompt acceleration. There was a problem of applying discomfort to the occupant of the vehicle.

SUMMARY OF THE INVENTION

An object of the present invention is to provide a control apparatus for a vehicle that can accelerate the vehicle while suppressing discomfort to an occupant.

Another object of the present invention is to provide a control apparatus for a vehicle that can calculate appropriate acceleration at the time of idling.

According to an aspect of the present invention, a control apparatus for a vehicle includes a detection unit for detecting a rate of change of an accelerator press-down degree, a setting unit for setting a rate of change of target acceleration of the vehicle based on the detected rate of change of accelerator press-down, a calculation unit for calculating the vehicle target acceleration based on the set target acceleration rate of change, and a control unit for controlling a driving force of the vehicle based on the calculated target acceleration.

According to the present invention, the target acceleration is calculated by integrating, for example, the rate of change of the target acceleration that is set based on the rate of change of accelerator press-down. Smooth target acceleration can be obtained thereby. The desired target acceleration can be obtained while suppressing abrupt change caused by the target acceleration being set in a stepped manner. The vehicle driving force is controlled so as to meet the target acceleration. Therefore, the feel of smooth acceleration having the jolt at the time of acceleration suppressed can be achieved at the desired acceleration. Thus, a control apparatus for a vehicle that can accelerate the vehicle while suppressing discomfort to the passenger can be provided.

Preferably, the control apparatus further includes a selection unit for selecting one running mode from a plurality of running modes having different running properties. The setting unit sets the rate of change of target acceleration according to the selected running mode.

According to the present invention, the rate of change of target acceleration can be set according to the running mode selected by the driver. Therefore, the vehicle can run with acceleration corresponding to the running mode.

Further preferably, the calculation unit integrates the set rate of change of target acceleration to calculate the target acceleration of the vehicle.

By integrating the rate of change of the target acceleration in accordance with the present invention, the target acceleration is calculated. In the case where the target acceleration is calculated directly, the target acceleration will change suddenly in a stepped manner. The acceleration will be changed abruptly, leading to the possibility of discomfort to the occupant. In the case where the target acceleration is calculated by integrating the rate of change of target acceleration, the target acceleration changes smoothly up to the desired target acceleration. Sudden change in the target acceleration in a stepped manner can be suppressed. Therefore, the smooth feel of acceleration having the jolt at the time of acceleration suppressed can be achieved at the desired acceleration.

Further preferably, an engine and a transmission linked to the engine are loaded into the vehicle. The control apparatus further includes an idling state detection unit detecting an idling state of the engine, an inhibition unit inhibiting calculation of the target acceleration by the calculation unit when an engine idling state is detected, a vehicle speed detection unit detecting the speed of the vehicle, a gear ratio detection unit detecting the gear ratio of the transmission, and an acceleration calculation unit calculating the target acceleration of the vehicle based on the detected vehicle speed and detected gear ratio.

According to the present invention, the target acceleration at the time of idling is determined in a one-to-one correspondence depending upon the state of the vehicle. This means that the target acceleration must be calculated, based on differentiation between an idling state and a non-idling state of the engine. When the engine is idle, calculation of the target acceleration based on the rate of change of the accelerator press-down is inhibited, and the target acceleration is calculated based on the vehicle speed and gear ratio. Thus, target acceleration appropriate to engine control in an idling state can be calculated depending upon the state of the vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart representing the transition of target acceleration when there is change in the accelerator press-down degree and the rate of change in accelerator press-down.

DESCRIPTION OF THE PREFERRED EMBODIMENT

Figure 1:
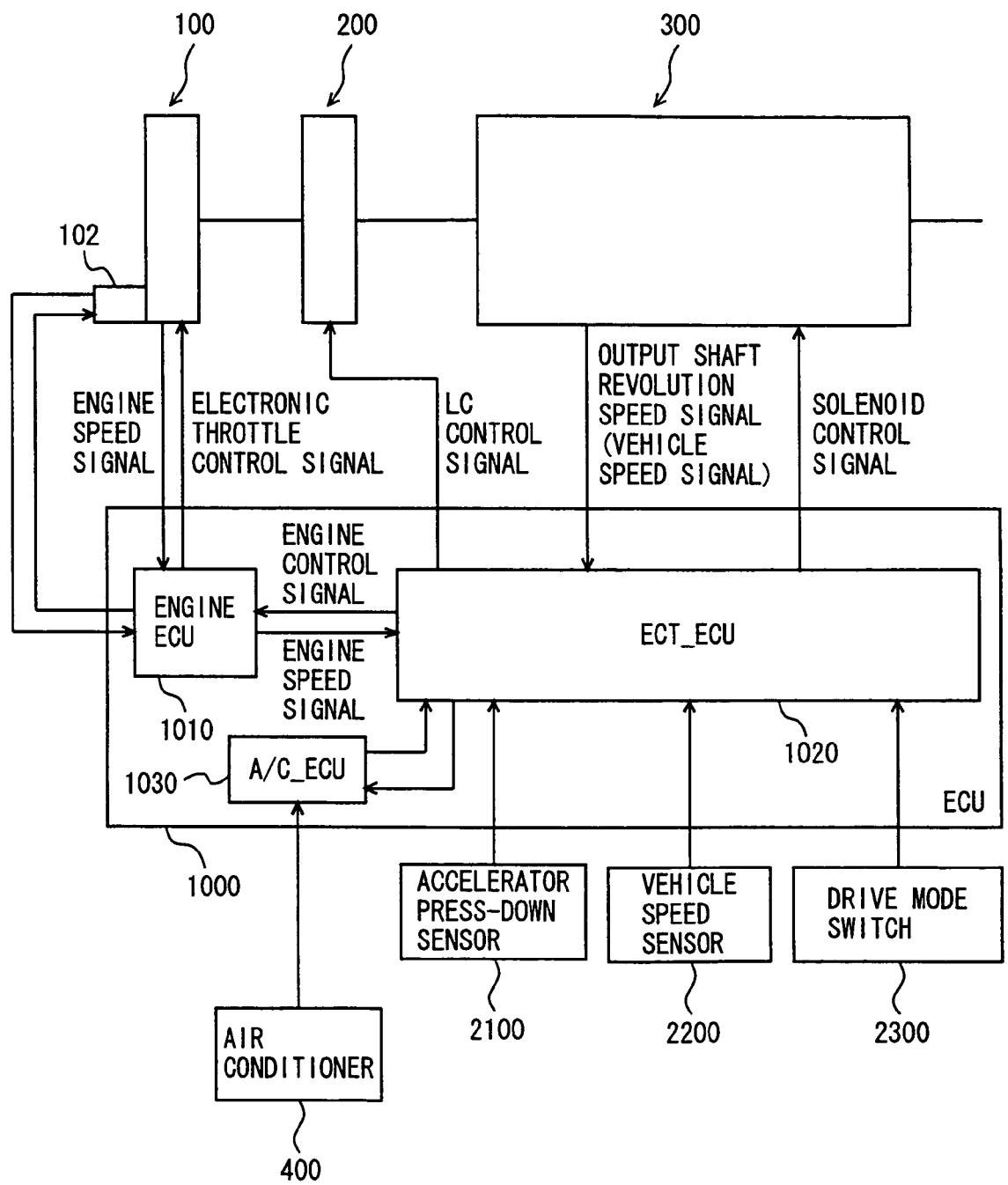
FIG. 1 is a control block diagram of a vehicle including a control apparatus for a vehicle according to an embodiment of the present invention.

An embodiment of the present invention will be described hereinafter with reference to the drawings. In the description set forth below, the same elements have the same reference characters allotted. Their designation and function are also the same. Therefore, details of the description thereof will not be repeated.

The power train of a vehicle including a control apparatus of the present embodiment will be described with reference to FIG. 1. The control apparatus for a vehicle according to the present invention is realized by a program executed by an ECU (Electronic Control Unit) 1000 shown in FIG. 1. The present embodiment will be described in which an automatic transmission with a gear type transmission includes a torque converter as a hydraulic coupling. It will be understood that the present invention is not limited to an automatic transmission with a gear type transmission mechanism. For example, a continuously variable transmission such as of the belt type may be employed. Further, the gear type transmission mechanism may be formed of a planetary gear, or a constant-mesh transmission gear.

Referring to FIG. 1, the power train of a vehicle includes an engine 100, a torque converter 200, an automatic transmission 300, and an ECU 1000.

The output shaft of engine 100 is connected to the input shaft of torque converter 200. Engine 100 and torque converter 200 are linked by a rotation shaft. Therefore, the output shaft revolution speed NE of engine 100 (engine speed NE) sensed by an engine speed sensor is identical to the input shaft revolution speed (pump revolution speed) of torque converter 200.

Torque converter 200 includes a lock up clutch that establishes direct connection between the input shaft and output shaft, a pump vane wheel at the input shaft side, a turbine vane wheel at the output shaft side, and a stator including a one-way-clutch to exhibit torque amplification capability. Torque converter 200 is connected to automatic transmission 300 through a rotation shaft. The output shaft revolution speed NT (turbine revolution speed NT) of torque converter 200 is sensed by a turbine revolution speed sensor. Output shaft revolution speed NOUT of automatic transmission 300 is sensed by an output shaft revolution speed sensor.

Such an automatic transmission 300 is equipped with a clutch and brake therein, qualified as a plurality of friction elements. The oil hydraulic circuit is controlled so that the friction elements such as a clutch element (for example, clutches C1-C4), a brake element (for example, brakes B1-B4), and a one-way clutch element (for example, one way clutches F0-F3) are engaged and released corresponding to each required speed of automatic transmission 300 based on a predetermined operation table. The gear position (shift position) of automatic transmission 300 includes a parking (P) position, reverse running (R) position, neutral (N), and forward running (D) position.

ECU 1000 that controls the power train set forth above includes an engine ECU 1010 controlling engine 100, an ECT (Electrically Controlled Transmission)_ECU 1020 controlling automatic transmission 300, and an A/C_ECU 1030 controlling an air conditioner 400.

ECT_ECU 1020 receives a signal representing the output shaft revolution speed NOUT sensed by the output shaft revolution speed sensor. ECT_ECU 1020 also receives from engine ECU 1010 an engine speed signal representing the engine speed NE sensed by the engine speed sensor.

These speed sensors are provided facing the teeth of the revolution detection gear attached to the input shaft of torque converter 200, the output shaft of torque converter 200, and the output shaft of automatic transmission 300. These speed sensors are sensitive enough to detect any slight rotation of the input shaft of torque converter 200, the output shaft of torque converter 200, and the output shaft of automatic transmission 300. Such a sensor employs a magneto-resistive element generally referred to as a semi-conductor sensor.

ECT_ECU 1020 outputs an engine control signal (for example, throttle open signal) to engine ECU 1010. Engine ECU 1010 controls engine 100 and an alternator 102 based on the engine control signal and other control signals. As will be described afterwards, ECT_ECU 1020 calculates the target acceleration of the vehicle to transmit an engine control signal that meets the calculated target acceleration to engine ECU 1010.

Engine ECU 1010 calculates the load applied to engine 100 by alternator 102 and transmits a signal representing the calculated load to ECT_ECU 1020. The method of calculating the load of alternator 102 is well known in the field of art, and detailed description thereof will not be provided here.

ECT_ECU 1020 outputs a lock up clutch control signal of torque converter 200. The engagement pressure of the lock up clutch is controlled based on the lock up clutch control signal. ECT_ECU 1020 outputs a solenoid control signal to automatic transmission 300. This solenoid control signal is used to control the linear solenoid valve, on/off solenoid valve, and the like of the oil-hydraulic circuit of automatic transmission 300, whereby the engagement and release of the friction engagement elements are controlled such that a predetermined transmission speed (for example, first speed to fifth speed) is implemented.

ECT_ECU 1020 receives a signal representing the press-down degree of the accelerator pedal operated by the driver from an accelerator press-down sensor 2100, a signal representing the vehicle speed from a vehicle speed sensor 2200, and a signal representing the current drive mode from a drive mode switch 2300. ECU 1000 includes a memory in which various data and programs are stored.

In accordance with the present embodiment, ECT_ECU 1020 selects a drive mode from a comfort mode or a sports mode in which acceleration is given more importance than in the comfort mode. The drive mode is selected based on a signal transmitted from drive mode switch 2300. Specifically, the occupant operates drive mode switch 2300 to select a desired drive mode. The drive mode is not limited to the comfort mode and the sport mode. Another drive mode may be employed.

A/C_ECU 1030 controls air conditioner 400 such that the cabin in the vehicle attains the desired temperature based on an operation by an occupant. A/C_ECU 1030 calculates the load applied to engine 100 by air conditioner 400 through a compressor (not shown) or the like to transmit a signal representing the calculated load to ECT_ECU 1020. The method of calculating the load of air conditioner 400 is well known in the field of art. Therefore, details of the description thereof will not be provided here.

Figure 2:
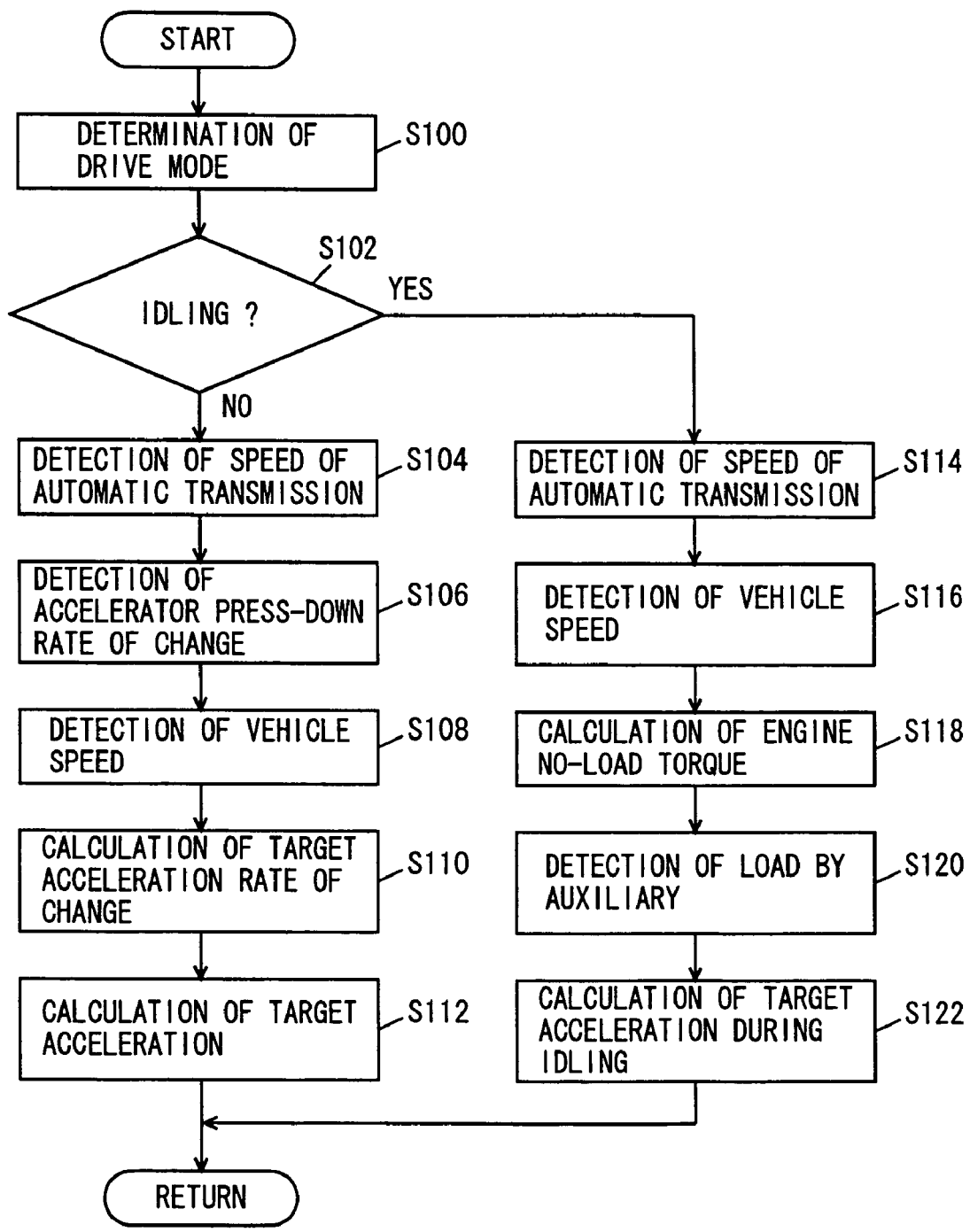
FIG. 2 is a flow chart of the control configuration of a program executed by an ECU identified as a control apparatus for a vehicle according to an embodiment of the present invention.

The control configuration of a program executed by ECT_ECU 1020 of ECU 1000 identified as a control apparatus according to the present embodiment will be described with reference to FIG. 2.

At step (hereinafter, step abbreviated as S) 100, ECT_ECU 1020 identifies the current drive mode based on the signal transmitted from drive mode switch 2300.

At S1102, ECT_ECU 1020 determines whether engine 100 takes an idling state or not based on the signal transmitted from accelerator press-down sensor 2100. When engine 100 takes an idling state (YES at S102), control proceeds to S114, otherwise (NO at S102), control proceeds to S104.

At S104, ECT_ECU 1020 detects the speed of automatic transmission 300, i.e., the gear ratio. Since ECT_ECU 1020 itself determines the speed of automatic transmission 300, speed detection is carried out within ECT_ECU 1020.

At S106, ECT_ECU 1020 detects the accelerator press-down rate of change based on the signal transmitted from accelerator press-down sensor 2100. At S108, ECT_ECU 1020 detects the vehicle speed based on the signal transmitted from vehicle speed sensor 2200.

At S110, ECT_ECU 1020 uses a map stored in the memory to calculate the target acceleration rate of change of the vehicle based on the drive mode, speed of automatic transmission 300, accelerator press-down rate of change, and vehicle speed. In the case where a drive mode is selected, the target acceleration rate of change is calculated at a higher value than when a comfort mode is selected. When the speed of automatic transmission 300 is low (high gear ratio), the target acceleration rate of change is calculated at a higher value than when the speed of automatic transmission 300 is high (low gear ratio). When the accelerator press-down rate of change is high, the target acceleration rate of change is calculated at a higher value than when the accelerator press-down rate of change is low. When the vehicle speed is low, the target acceleration rate of change is calculated at a higher value than when the vehicle speed is high.

At S112, ECT_ECU 1020 calculates the target acceleration by integrating the calculated target acceleration rate of change with respect to time. Then, the process ends.

At S114, ECT_ECU 1020 detects the speed of automatic transmission 300, i.e. the gear ratio. Since ECT_ECU 1020 itself determines the speed of automatic transmission, speed detection is carried out within ECT_ECU 1020. At S116, ECT_ECU 1020 detects the vehicle speed based on the signal transmitted from vehicle speed sensor 2200.

At S118, ECT_ECU 1020 calculates the torque in the case where there is no load on engine 100. The torque in a no-load state of engine 100 is calculated by engine ECU 1010 based on parameters such as whether the fuel is cut or not, the opening of the idle speed control valve (not shown), and the fuel injection quantity. A signal representing the calculated torque is transmitted to ECT_ECU 1020. Since the torque in a no-load state of engine 100 can be calculated through well-known techniques, details of the description thereof will not be provided here.

At S120, ECT_ECU 1020 detects the load by auxiliaries such as alternator 102 and air conditioner 400 based on signals transmitted from engine ECU 1010 and A/C_ECU 1030.

At S122, ECT_ECU 1020 uses a map stored in the memory to calculate the target acceleration in an idling state based on the vehicle speed, speed of automatic transmission 300, engine no-load torque, and loads by auxiliaries. Then, the process ends.

An operation of ECT_ECU 1020 identified as the control apparatus of the present embodiment will be described hereinafter based on the structure and flow chart set forth above.

During startup of the vehicle system, the current drive mode is identified based on the signal transmitted from drive mode switch 2300 (S100). Then, determination is made whether engine 100 is in an idling state or not based on the signal transmitted from accelerator press-down sensor 2100 (S102).

When engine 100 is not in an idling state (NO at S102), detection of the speed of automatic transmission 300 (S104), the accelerator press-down rate of change (S106), and the vehicle speed (S108) is conducted. Then, using a map stored in the memory, the target acceleration rate of change of the vehicle is calculated based on the drive mode, speed of automatic transmission 300, accelerator press-down rate of change, and vehicle speed (S110). This target acceleration rate of change is integrated with respect to time, whereby the target acceleration is calculated (S112).

In the case where the target acceleration is directly calculated as in the conventional case, the target acceleration will change suddenly in a stepped manner by the change in the accelerator press-down and accelerator press-down rate of change, as indicated by the chain-dotted line in FIG. 3. This means that the acceleration will change abruptly, leading to the possibility of applying discomfort to the passenger.

When the target acceleration is calculated by integrating the target acceleration rate of change as in the present embodiment, the target acceleration changes smoothly up to the desired target acceleration, as indicated by the solid line in FIG. 3. Accordingly, abrupt stepped change in the target acceleration caused by change in the accelerator press-down and accelerator press-down rate of change can be suppressed. Therefore, the desired acceleration for the driver can be met while suppressing a feel of jolt caused by sudden acceleration.

The target acceleration at the time of idling is determined in a one-to-one correspondence based on the state of the vehicle as well as the torque property when there is no load on engine 100. It is therefore necessary to calculate the target acceleration, based on differentiation between an idling state and a non-idling state.

When engine 100 takes an idling state (YES at S102), calculation of the target acceleration by integrating the target acceleration rate of change is not carried out (inhibited). Gearing detection (S114), vehicle speed detection (S116), calculation of the torque when there is no load on engine 100 (S118), and detection of load by auxiliaries (S120) are carried out. Then, the target acceleration is calculated directly based on the speed of automatic transmission 300, vehicle speed, the torque when there is no load on engine 100, and the load by auxiliaries (S122).

Thus, when engine 100 takes an idling state in which the driver does not request acceleration, target acceleration appropriate to control of engine 100 under an idling state can be calculated corresponding to the state of the vehicle.

The ECT_ECU identified as a control apparatus of the present embodiment calculates a target acceleration rate of change based on the accelerator press-down rate of change. The ECT_ECU calculates the target acceleration by integrating the target acceleration rate of change with respect to time. Accordingly, target acceleration that changes smoothly up to the desired target acceleration can be achieved. The engine is controlled such that this target acceleration is met. The vehicle can be accelerated at the desired acceleration while suppressing the jolt caused by abrupt change in the acceleration. Thus, acceleration can be achieved while suppressing discomfort to the passenger.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a vehicle, comprising:
   a detection unit for detecting a rate of change of an accelerator press-down degree,
   a setting unit for setting a rate of change of target acceleration of the vehicle based on said detected accelerator press-down rate of change,
   a calculation unit for calculating said vehicle target acceleration based on said set target acceleration rate of change, and
   a control unit for controlling a driving force of the vehicle based on said calculated target acceleration.

2. The control apparatus for a vehicle according to claim 1, further comprising a selection unit for selecting one running mode from a plurality of running modes differing in running property,
   wherein said setting unit sets said target acceleration rate of change according to said selected running mode.

3. The control apparatus for a vehicle according to claim 1, wherein said calculation unit integrates said set target acceleration rate of change to calculate said target acceleration of the vehicle.

4. The control apparatus for a vehicle according to any of claims 1-3, wherein said vehicle is loaded with an engine, and a transmission linked to said engine,
   said control apparatus further comprising:
   an idling state detection unit for detecting an idling state of said engine,
   an inhibition unit for inhibiting calculation of target acceleration by said calculation unit when said idling state of the engine is detected,
   a vehicle speed detection unit for detecting vehicle speed,
   a gear ratio detection unit for detecting a gear ratio of said transmission, and
   an acceleration calculation unit for calculating said vehicle target acceleration based on said detected vehicle speed and said detected gear ratio.

5. A control apparatus for a vehicle, comprising:
   detection means for detecting a rate of change of an accelerator press-down degree,
   setting means for setting a rate of change of target acceleration of the vehicle based on said detected accelerator press-down rate of change,
   calculation means for calculating said vehicle target acceleration based on said set target acceleration rate of change, and
   control means for controlling a driving force of the vehicle based on said calculated target acceleration.

6. The control apparatus for a vehicle according to claim 5, further comprising means for selecting one running mode from a plurality of running modes differing in running property,
   wherein said setting means includes means for setting said target acceleration rate of change according to said selected running mode.

7. The control apparatus for a vehicle according to claim 5, wherein said calculation unit includes means for integrating said set target acceleration rate of change to calculate said target acceleration of the vehicle.

8. The control apparatus for a vehicle according to any of claims 5-7, wherein said vehicle is loaded with an engine, and a transmission linked to said engine,
   said control apparatus further comprising:
   means for detecting an idling state of said engine,
   means for inhibiting calculation of target acceleration by said calculation means when said idling state of the engine is detected,
   means for detecting vehicle speed,
   means for detecting a gear ratio of said transmission, and
   means for calculating said vehicle target acceleration based on said detected vehicle speed and said detected gear ratio.

* * * * *